United States Patent
Lo et al.

[11] 3,908,112
[45] Sept. 23, 1975

[54] CALCULATOR FOR STEREOSCOPIC PHOTOGRAPHY

[75] Inventors: Allen K. W. Lo, Atlanta; Jerry C. Nims, Dunwoody, both of Ga.

[73] Assignee: Dimensional Development Corporation, Atlanta, Ga.

[22] Filed: June 19, 1974

[21] Appl. No.: 480,866

[52] U.S. Cl. .............. 235/61 B; 235/64.7; 235/78; 235/88
[51] Int. Cl.² .......................................... G06C 3/00
[58] Field of Search ......... 235/61 B, 64.7, 83, 84, 235/88, 89

[56] References Cited
UNITED STATES PATENTS

| | | | |
|---|---|---|---|
| 1,262,635 | 4/1918 | Cady | 235/88 R |
| 1,922,465 | 8/1933 | Woodward | 235/78 R |
| 2,229,479 | 1/1941 | Smiley | 235/64.7 |
| 2,422,663 | 6/1947 | Feild | 235/84 |
| 2,445,008 | 7/1948 | Smidt | 235/64.7 |
| 2,476,591 | 7/1949 | Frazer | 235/64.7 |
| 2,489,664 | 11/1949 | Norwood | 235/64.7 |
| 3,044,692 | 7/1962 | Buus et al. | 235/61 B |
| 3,436,012 | 4/1969 | Stephenson | 235/61 B |

*Primary Examiner*—Lawrence R. Franklin
*Attorney, Agent, or Firm*—Brumbaugh, Graves, Donohue & Raymond

[57] ABSTRACT

In the illustrative embodiment of the invention disclosed, a calculator for use in stereoscopic photography embodies a suitable combination and arrangement of scales and indicators for enabling determination of the locations relative to the camera of the foreground element, the background element and the key subject matter element of a photographic scene which will be productive of certain desired parallax effects or values between the images of those elements on the final stereoscopic picture. The calculator also permits computation of the distance over which the camera should be moved in photographing the scene to afford both optimum relief effect and solid sharply focused foreground and background images.

8 Claims, 6 Drawing Figures

CALCULATOR FOR STEREOSCOPIC PHOTOGRAPHY

BACKGROUND OF THE INVENTION

This invention relates generally to the production of stereoscopic pictures by the indirect technique and, more particularly, to a novel calculator useful in arranging the subject matter to be photographed and in subsequently photographing the same in a manner productive of high quality stereoscopic pictures.

In the indirect technique of stereoscopic photography, a series of two-dimensional views of the scene or object field to be photographed is recorded at a number of aligned horizontally-spaced vantage point, and an integrated three-dimensional picture of the object field is composed from the several two-dimensional views by projecting them, in proper registry, onto a photosensitive surface underlying a lenticular screen. Ideally, the resulting stereoscopic picture will present the images of all elements of the object field in sharp focus, without discontinuities in the integrated image and with a proper three-dimensional effect. In furtherance of this object, Lo and Nims, in copending commonly-owned U.S. application Ser. No. 398,990, filed Sept. 20, 1973 for "Methods and Apparatus for Taking and Composing Stereoscopic Pictures," provide improved methods and apparatus for controlling the several variables of the recording and composing steps which bear upon and ultimately determine the quality of the final picture. This is accomplished in essential part by so governing the variables as to constrain the magnitudes of certain parallax effects or values produced in the stereoscopic picture within specified limits. These parallax values and the corresponding limits are fully described in application Ser. No. 398,990 and are also set out in some detail hereinafter. Generally, however, in accordance with the teachings of application Ser. No. 398,990, the pertinent variables affecting the parallax values produced are controlled according to the following relationships:

$$\frac{k}{a} + \frac{k}{b} = 2 \qquad (1)$$

$$T = \frac{X_{T''} \, ab}{Rf(b-a)} \qquad (2)$$

where: $k$ is the distance from the camera to the element (K) of the object field on which the camera is focused, i.e., the element whose image is to lie in the plane of the stereoscopic picture;

$a$ is the distance from the camera to the nearest foreground element (A) of the object field;

$b$ is the distance from the camera to the farthest background element (B) of the object field;

$T$ is the distance between the endmost photographic vantage points, i.e., the length of the stereoscopic base;

$X_{T''}$ is the total parallax value on the stereoscopic picture between the images of the nearest foreground element and the farthest background element;

$R$ is the enlargement ratio employed in producing the stereoscopic picture; and $f$ is the focal length of the camera objective used in taking the two-dimensional views.

Selection and control of the recording step and the composing step variables pursuant to equations (1) and (2) enable photographers consistently to produce stereoscopic pictures of high quality under substantially all photographic conditions. But since one or more of the distances $a$, $k$ and $b$ typically differ from one photographic scene to another, repeated solutions of the equations ordinarily are required even when the enlargement ratio R and camera focal length $f$ are unchanged, which of course often is not the case. Such solutions may be done manually, but this entails numerous calculations by hand with substantial likelihood of error. An effort has been made to obviate this problem by providing the information in table form. Considerable time is required in order to correlate all of the pertinent variables when using tables, however, and experience has shown that it still remains comparatively easy for errors to occur.

SUMMARY OF THE INVENTION

It is therefore an object of the present invention to provide a calculator for aiding the photographer in solving the foregoing equations in a rapid yet comparatively error-free manner.

This and other objects of the invention are attained by the provision of a calculator generally in the format of a rectangular or circular slide rule. It includes a base member and three indicators secured to the base member for rotation about a common reference point. Inscribed on the base member are two scales arranged on opposite sides of the reference point. Where circular, the scales are concentric with the reference point. One scale represents distance from the lens plane of the camera to elements within the object field. The other scale is unitless, and is so arranged relative to the distance scale that an equal number of graduations on either side of any particular point on the scale will afford corresponding readings of $a$, $k$ and $b$ on the distance scale, where the $k$ reading corresponds to the particular point on the other scale, which stand in the relationship of equation (1). Readings are made on the two scales by means of the indicators, which are of sufficient length to overlie both scales at once. One indicator is associated with the nearest foreground element (A) and is used to locate $a$ on the distance scale, another corresponds to the farthest background element (B) and is used to locate $b$, and the third is for the key subject matter element (K) and is used to read $k$. By use of the scales and indicators described, values of $a$, $k$, or $b$ may readily be determined which satisfy equation (1) and which therefore will afford the desired parallax effects or values in the stereoscopic picture.

The calculator includes an additional scale or scales, each of which corresponds to a particular focal length $f$ of the camera used in taking the two-dimensional views of the object field. Preferably, a plurality of such scales, embracing a variety of common focal lengths, are provided. These scales, together with the distance scale and the appropriate indicators, furnish information, suitably in the form of index numbers, related to the value of T called for by any particular set of variables in accordance with equation (2). By reference to a chart relating specific index numbers and specific T values, the appropriate T value may be determined. For convenience, this cart preferably is printed on the base member.

BRIEF DESCRIPTION OF THE DRAWINGS

The foregoing and other features of the invention will be more readily apparent from the following detailed description and drawings, in which.

DETAILED DESCRIPTION

Figure 1:
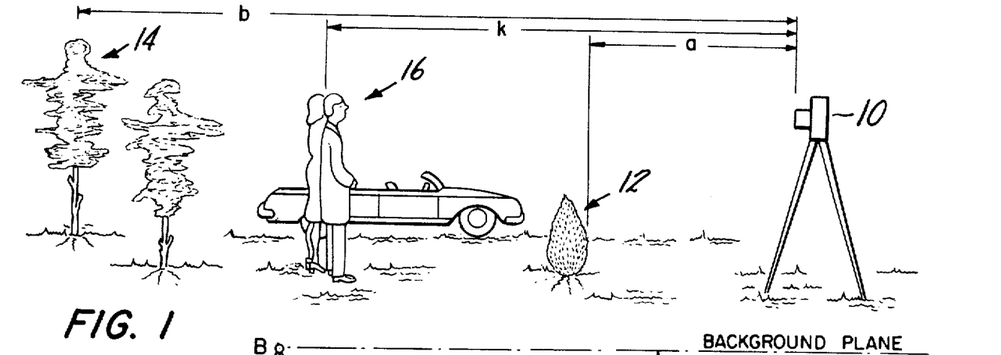
FIG. 1 is a diagrammatic view showing a typical object field and camera arrangement when taking a stereoscopic picture.

FIG. 1 illustrates a typical snapshot-type photographic situation in which a conventional two-dimensional camera 10 is arranged in position to photograph the object field depicted. In the object field, there is a nearest foregoing element, e.g., a bush 12, and a farthest background element, e.g., a tree 14. Other foreground and background elements may be present, and it will be understood that the terms "nearest foreground element" and "farthest background element" refer to the elements nearest to and farthest from, respectively, the camera 10. Intermediate to the foreground element 12 and the background element 14 is the element (here indicated as two people) 16 whose image or a portion thereof is to appear in the plane of the three-dimensional picture. Element 16 is designated as the "key subject matter element."

In accordance with the teachings of application Ser. No. 389,990, the pertinent portions of which are hereby incorporated into this specification, a high quality stereoscopic picture of the object field will be obtained if the locations of the object field elements 12, 14 and 16 relative to the camera 10 and to one another are properly selected and if the distance over which the camera is moved in taking the two-dimensional views, i.e., the length of the stereoscopic base, is maintained in correct proportion to the desired parallax values between the images on the stereoscopic picture of the nearest foreground element 12, the key subject matter element 16 and the farthest background element 14. The purposes of these controls and the manner of their accomplishment may be seen from FIG. 2.

Figure 2:
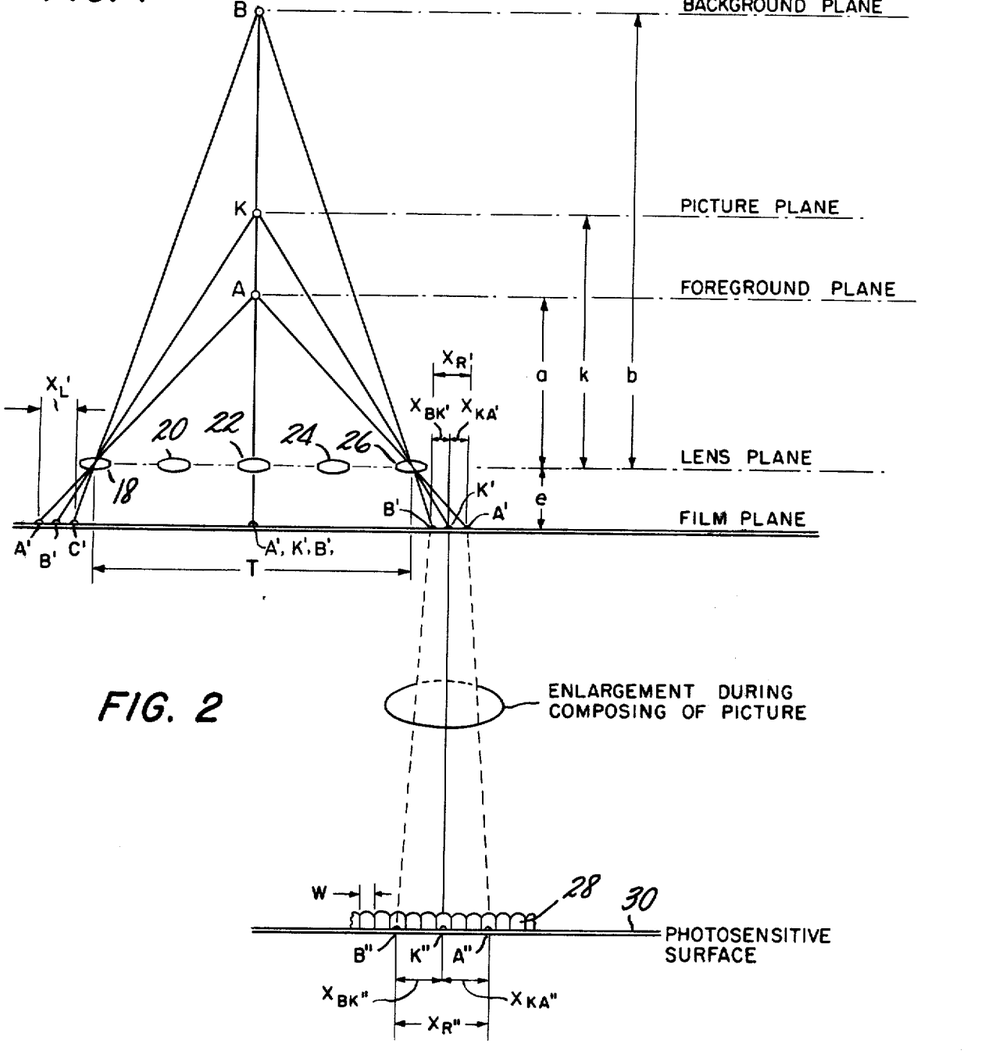
FIG. 2 is a diagrammatic view illustrating the manner in which the several variables of the recording and composing steps of the indirect technique of stereoscopic photography are controlled, in accordance with U.S. application Ser. No. 398,990, to achieve the desired parallax value control.

FIG. 2 depicts a generalized object field, including a nearest foreground element A, a key subject matter element K and a farthest background element B, arranged for convenience of illustration in a straight line, and a plurality N, here five, of camera locations or vantage points from which a corresponding plurality N of two-dimensional views of the object field are taken along generally parallel lines of sight. The separate vantage points, indicated by the lens location 18, 20, 22, 24 and 26, are equidistantly spaced apart along a straight path which is generally perpendicular to the lines of sight and preferably are centered on the line passing through the key subject matter element K. In placing the camera 10 at the individual vantage point, care should be taken to keep the optical center of the objective lens system in the same plane, designated the lens plane in FIG. 2, as it is from this plane that the distances $a$, $k$ and $b$ to the respective object field elements are determined. It will be understood that the thin lenses illustrated at 18–26 are representative of the composite objective lens system typically found in conventional cameras.

When the camera is located at the central position 22, the images A', K' and B' of the foreground, key subject matter and background elements A, K and B, respectively, formed at the camera film plane will coincide in the idealized object field arrangement of FIG. 2. With increasing distance from the central location, however, the images A', K' and B' are increasingly displaced from one another, reaching their maximum separations at the endmost vantage points 18 and 26. These displacements are known as parallax, and their magnitudes are denoted herein and in application Ser. No. 398,990 as parallax values. Three parallax values are significant, that between the image A' of the nearest foreground element A and the image K' of the key subject matter element K, referred to hereinafter as the foreground-key subject matter parallax value and designated $X_{KA'}$, that between the key subject matter element image K' and the image of the farthest background element B, referred to hereinafter as the background-key subject matter parallax value and designated $X_{BK'}$, and the sum of $X_{KA'}$ and $X_{BK'}$ at each endmost vantage point, identified herein as $X_{L'}$ for the lefthand vantage point 18 and $X_{R'}$ for the righthand vantage point 26. The sum of $X_{L'}$ and $X_{R'}$ is also significant, as discussed hereinafter, and is designated $X_{T'}$. If the camera locations are centered on the object field of FIG. 2, as typically would be the case, $X_{L'}$ and $X_{R'}$ would be substantially equal and $X_{T'}$ would simply be twice as large as either. The camera locations, however, need not be centered. Nevertheless, $X_{T'}$ remains equal to the sum of $X_{L'}$ and $X_{R'}$ and substantially constant, even though the relative values of $X_{L'}$ and $X_{R'}$ do vary with the degree of asymmetry of the vantage points, so long as the distance T (see FIG. 2) between the endmost vantage points 18 and 26 is the same. It is the total parallax value $X_{T'}$, therefore, with due account to the effect thereon of the extent of enlargement of the two-dimensional views in producing the sterescopic picture, which is employed in equation (2) in determining a proper value of T.

FIG. 2 illustrates the effect of enlargement during the composing step on the aforementioned parallax values. In composing a stereoscopic picture using the two-dimensional views, each two-dimensional view is projected through a lenticular screen 28 and onto a photosensitive surface 30, e.g, in the form of a separate film sheet or an emulsion coated on the back of the lenticular screen, thereby forming images A", K" and B" corresponding to the images A', K' and B' on the two-dimensional views. The manner in which this projection is carried out so as to provide the desired image structure behind the lenticular screen is fully described in application Ser. No. 398,990 and need not be repeated here except by reference. Normally the projected images will be enlarged, with the result that the magnitudes of the parallax values will likewise be increased. Thus, as illustrated in FIG. 2 in connection with the images recorded at the righthand endmost vantage point 26, the parallax values $X_{KA''}$, $X_{BK''}$ and $X_{R''}$ on the stereoscopic picture will be increased from the corresponding values $X_{KA'}$, $X_{BK'}$ and $X_{R'}$ on the two-dimensional view from vantage point 26 by the factor of the enlargement ratio. In accordance with application Ser. No. 398,990, it is the magnitudes of the parallax values on the final stereoscopic picture which are determinative of the quality of the picture.

Specifically, the referenced portions of that application provide that the maximum values of $X_{KA''}$ and $X_{HK''}$ on the final picture, i.e., those between projected images from the view recorded at an endmost vantage point, should not exceed cW(N-1) and that the maximum value of the total parallax value $X_{T''}$ should not exceed 2cW(N-1), where c is the distance along the photosensitive surface 30 between the A'' images or the B'' images, as expressed in terms of the number of lenticules or fraction thereof within that distance, from adjacent vantage points. The value of c is selected in accordance with photographic conditions and may vary anywhere from 1/(N-1) to 10.0. As set out in application Ser. No. 398,990, for typical snapshot conditions c might conveniently be selected as 1.0 to 5.0. Accordingly, once the lenticule width W to be used is determined and the number N of two-dimensional pictures to be taken is decided upon, the maximum permissible values of $X_{KA''}$, $X_{HK''}$ and $X_{T''}$ are readily determined. So long as these maximum permissible values are not exceeded, the images of all object field elements appearing in the picture will be sharply focused and a solid uninterrupted image of the object field will be presented to the viewer.

In order at the same time to provide optimum three-dimensional effect in the picture, application Ser. No. 398,990 provides that the object field elements A, K and B should be so arranged relative to one another and to the camera 10 that the parallax values $X_{KA''}$ and $X_{HK''}$, and of course the corresponding parallax values $X_{KA'}$ and $X_{HK'}$ on the two-dimensional views, should be substantially equal. This is accomplished by selecting the distances a, k and b (see FIG. 2) in accordance with equation (1) above. When this is done, $X_{KA''}$ will equal $X_{HK''}$ and, assuming c is selected at the maximum value for the photographic conditions at hand, the maximum permissible values of $X_{KA''}$, $X_{HK''}$ and $X_{T''}$ will be achieved. This will result in the maximum relief effect in the stereoscopic picture commensurate with the presentation of a high quality integrated image. To assure, then, that the maximum permissible values of $X_{KA''}$ and $X_{HK''}$ are substantially achieved but not exceeded when taking the two-dimensional views, the length of the stereoscopic base T over which the two-dimensional views are made is determined according to equation (2), as provided in application Ser. No. 398,990. Hence by appropriate selection of the value of $X_{T''}$ and, therefore, control of the aforementioned recording step and composing step variables in accordance with equations (1) and (2), stereoscopic pictures of high quality may consistently be produced under substantially all photographic conditions.

Organization and Use of the Calculator

Figure 3:
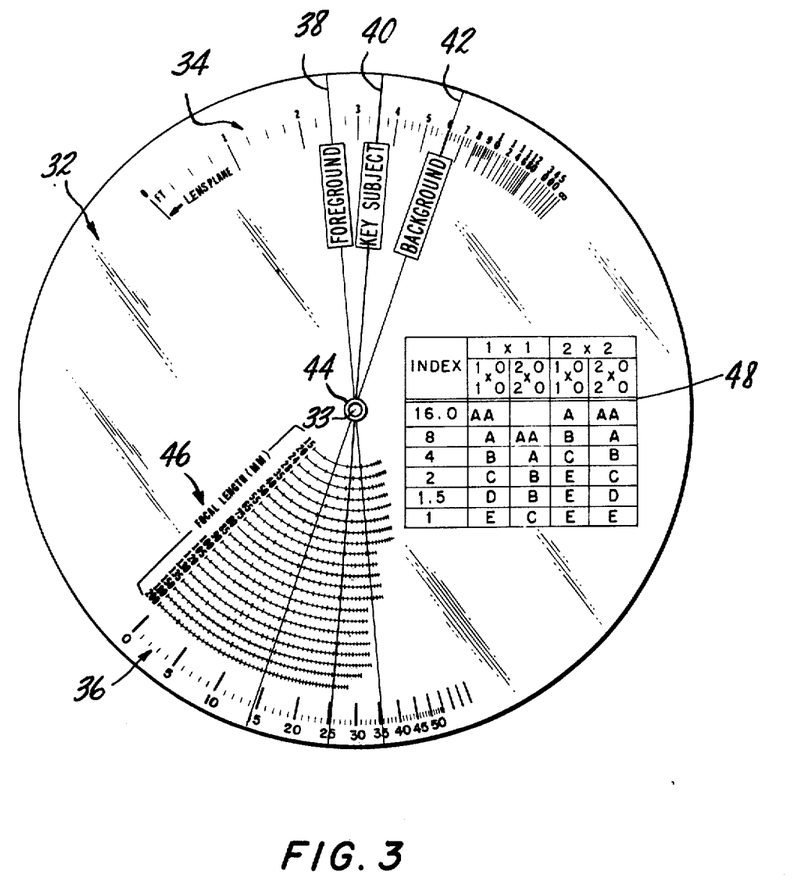
FIG. 3 portrays an illustrative embodiment of a calculator constructed in accordance with the invention.

A representative embodiment of a calculator useful, in accordance with the invention, in implementing equations (1) and (2) in practice is illustrated in FIG. 3. For clarity, its overall organization and use are first described, followed by a detailed description of the manner of its construction and calibration.

The calculator includes a base member 32 which, for convenience, may be generally circular in shape. A reference point 33 is established centrally of the base member 32, and two scales 34 and 36 in the form of arcs concentric with point 33 are inscribed along diametrically opposite portions of the base member. Scale 34 is graduated in any convenient units, e.g., feet, to represent distance from the lens plane of the camera to elements in the object field, as measured in a direction generally perpendicular to the lens plane. Scale 36 is unitless, as described hereinafter, and is arranged relative to and coacts with scale 34 and with three indicators 38, 40 and 42 to enable a solution of equation (1). The indicators extend along diameters of the arcs along which scales 34 and 36 are arranged, are of a length sufficient to overlie both scales, and are supported on the base member 32 in superimposed relation for individual pivotal movement about reference point 33. Suitably, the indicators 38, 40 and 42 comprise straight lines marked on transparent members (not shown for clarity) of any convenient configuration, the transparent members being secured to the base member 32 by a grommet 44. Indicator 38 is labeled FOREGROUND and is used to indicate the foreground distance a on scale 34. Similarly, indicator 40 is labeled KEY SUBJECT and locates the distance k on scale 34, while indicator 42 is labeled BACKGROUND and is used to read the distance b on scale 34.

Intermediate to scale 36 and reference point 33 is a series 46 of scales corresponding to common focal lengths of camera lenses. The focal length scales are arranged along arcs of different radii, all of which are centered about reference point 33. Focal lengths are indicated on the base member 32 in millimeters for convenience of reference. These scales are used in conjunction with scale 34 and indicators 38 and 42 to determine an appropriate index number for specific values of a, b and f.

Also printed on the base member 32 is a chart 48 which gives values of T corresponding to index numbers determined from scales 46 and to specific enlargement ratios. For convenience in using chart 48, the enlargement ratios are indicated thereon in terms of two-dimensional film frame formats, e.g. 1 × 1 inch, 2 × 2 inches, etc., and desired stereoscopic pictures sizes, e.g. 10 × 10 inches, 20 × 20 inches, etc. The film formats and picture sizes depicted have been selected for ease of illustration herein, i.e., corresponding to R's of 5, 10 and 20, but it will be understood that commonly used film formats and picture sizes preferably would be used.

Values of T in chart 48 may be expressed in any convenient way. As depicted in FIG. 3, for example, chart 48 indicates the T values in terms of letters C, D, E, etc., which refer to specific tracks of a camera tracking support of the type described and illustrated in copending application Ser. No. 398,990. One such support is manufactured by Infinioptic, Inc., Atlanta, Ga., under the trademark COMPUTRAK 190. Each track on the camera support includes a number of notches equal to the number of two-dimensional views to be taken, e.g. eleven. The notches of each track are equidistantly spaced apart over a distance T, with the various tracks having different T distances which progress gradually in length from a shortest track to a longest track. With this arrangement, the camera support provides a selection of tracks of different T values, one of which will be appropriate for use in most photographic conditions. Of course, if desired, the T values could be expressed in chart 48 directly in dimensions rather than as reference letters to tracks of a camera support. Alternatively, the T values could be given in terms of the spacing between adjacent vantage points, rather than in terms of the total distance T spanned by all of the vantage points. In this way, the T values can be expressed independently of the number N of two-dimensional views to be taken. In any event, it will be appreciated that, together, scales 34 and 46 and indicators 38 and 42 afford information which, when correlated in chart 48 with a specific enlargement ratio, provides a solution of equation (2) for the proper length T of the stereoscopic base to be used for any particular object field arrangement.

The relationships between the several elements of the calculator may be further appreciated by means of representative examples of its use. Assuming that a photographer desires to photograph the object field of FIG. 1 and that he desires the nearest foreground element to be the bush 12, the farthest background element to be the tree 14 and the key subject matter element to be the people 16, he would place his camera 10 at a convenient distance from the bush 12 and preferably center it on the people 16. The photographer may then determine the values of $a$ and $b$ by measuring the distance from the optical center of the camera lens to the nearest point of bush 12 and the farthest point of tree 14, respectively, which are within the field of view of the camera when it is at the endmost vantage points. In making these measurements it is often more convenient to measure from the film plane of the camera than from the optical center of the lens. This would of course give measurements which differ from the optical center measurements by the value of $e$ (see FIG. 2). In most photographic conditions, however, the correct distances may be obtained to a very good approximation by subtracting the focal length $f$ of the lens from the measured distance from the film plane. For close-up photography and particularly where $e$ exceeds $f$ by more than 10 percent, it is desirable to subtract $e$ from the measured distance instead of $f$. The value of $e$ may be determined from:

$$e = \frac{kf}{k-f} \quad (3)$$

The photographer then needs to know where to place the people 16 relative to the bush 12 and the tree 14 to obtain substantially equal values of $X_{KA''}$ and $X_{BK''}$. This is done by use of scales 34 and 36 of the calculator of FIG. 3. Assuming, for example, that $a$ is 2.5 ft and that $b$ is 6 ft, the FOREGROUND indicator 38 is placed at 2.5 ft and the BACKGROUND indicator 42 at 6 ft, respectively, on scale 34, as is depicted in FIG. 3. The corresponding readings of the FOREGROUND indicator 38 and the BACKGROUND indicator 42 are then noted on scale 36, these being, in the example illustrated in FIG. 3, approximately 35 and 15, respectively. Next, the KEY SUBJECT indicator 40 is positioned at a reading on scale 36 halfway between the FOREGROUND and BACKGROUND indicators, i.e., approximately at 25. The proper value of $k$ may then be read from scale 36 by noting the point of intersection of the KEY SUBJECT indicator 40 with that scale. In the illustrative example depicted in FIG. 3, this is approximately 3.5 ft. The people 16 of FIG. 1 would therefore be positioned approximately 3.5 ft from the camera 10.

It remains then to determine the distance T between the endmost vantage points from which the two-dimensional pictures are to be taken by reference to scales 46 and chart 48. When entering the index scales 46, the given focal length of the camera would normally be used. However, where the magnitude of $e$ as determined from equation (3) above is significantly greater than $f$, e.g. 10 percent or more, more accurate control of the parallax values is obtained by entering scales 46 with the value of $e$ in place of $f$. If $f$ is assumed to be 50mm in the example described, $e$ is approximately 52.5mm. This is well within 10 percent of the assumed value of $f$ of 50mm, and the 50mm scale of scales 46 may therefore be employed without significant error.

Keeping the FOREGROUND indicator at 2.5 ft and the BACKGROUND indicator at 6 ft on scale 34, the number of divisions along focal length scale 50 lying between the intercepts therewith of indicators 38 and 42 is determined. This number is used in identifying the appropriate index number in chart 48. Where the number of divisions, to the closest full division, is equal to an index number, that index number is used. However, where the number of divisions falls between two index numbers, the next larger index number should be used. This assumes that, as in the calculator of FIG. 3, the T values of the tracks decrease with increasing index numbers. The object here is always to use a T value which will allow the maximum permissible parallax value $X_{T''}$ to be closely approached but not exceeded. In the example portrayed, approximately nine divisions lie between the intercepts of the indicators with focal length scale 50. The appropriate index number in chart 48 is therefore 16.0.

Thereafter, the correct value of T or the track identification letter, as the case may be, may be obtained from chart 48 by locating the column opposite index number 16.0 which corresponds to the film frame size used in taking the two-dimensional views and the desired size of the stereoscopic picture. For instance, if a 1 × 1 inches film format is used and the final picture size is to be 10 × 10 inches, the appropriate track on the camera support would be AA.

It will be appreciated, therefore, that track AA will have a predetermined number of equidistantly spaced camera locations and that the distance T between the endmost vantage points will be approximately equal to the value of T afforded by a solution of equation (2) for the specific values of the terms of that equation assumed in this example. Since index number 16.0 is higher than the number of divisions along the 50mm focal length scale, the actual T value of track AA will be slightly smaller than the value obtained from equation (2).

Having determined the correct positions of the nearest foreground element, the key subject matter element and the farthest background element of the object field relative to each other and to the camera and the correct T value or track to be used, the camera may be set up to take the N two-dimensional views of the object field by first centering the vantage points on the object field, preferably, though not necessarily, such that a line perpendicular to the film plane of the camera will pass through some portion of the key subject matter element. Starting at one endmost vantage point, suitably that at the righthand side of the central point, a two-dimensional view of the object field is taken at each vantage point until the N views are obtained. These views may then be used in the aforementioned manner to compose an integrated stereoscopic picture.

In certain photographic conditions, it may be desirable for artistic or other purposes first to select the distance $k$ to the key subject matter element and thereafter arrange the foreground and background elements relative to the key subject matter element. In such instances, the calculator of FIG. 3 may be used to determine the correct placement of the foreground element or the background element once the distances to the key subject matter element and to one of the foreground element and the background element have been selected. If it is assumed, for example, that the key subject matter element is to be 3.5 ft from the camera film plane and that the background element is to be at 6 ft, the KEY SUBJECT indicator 40 and the BACKGROUUND indicator 42 are located on scale 34 accordingly. The number of divisions along scale 36 between the two indicators is then noted, being in this instance approximately ten divisions (25 minus 15). This number of divisions is then added to the reading of the KEY SUBJECT indicator on scale 36, i.e., 25, and the FOREGROUND indicator 38 is placed in registry with the total reading, i.e., 35. The proper distance $a$ to the foreground element may then be read from scale 34 at the point where the FOREGROUND indicator 38 intersects that scale. For the exemplary values of $k$ and $b$ given, the corresponding value of $a$ is 2.5 ft.

In a like manner, the correct distance $b$ to the background element may be determined where the key subject matter distance $k$ and the foreground distance $a$ are initially selected. This is accomplished by locating the FOREGROUND indicator 38 and the KEY SUBJECT indicator 40 at the proper places on scale 34, e.g. at 2.5 ft and 3.5 ft, respectively, noting the number of divisions along scale 36 subtended by the indicators 38 and 40, subtracting that number of divisions from the reading of the KEY SUBJECT indicator 40 on scale 36, and placing the BACKGROUND indicator 42 in alignment with the value on scale 36 thus obtained. For $a = 2.5$ ft and $k = 3.5$ ft, the location of BACKGROUND indicator 42 along scale 36 would be at a reading of approximately 15, and the corresponding value of $b$ from scale 34 is 6 ft. Once $a$ and $b$ have been properly determined, the correct value of T can be obtained in the manner described above.

The foregoing description and explanation of the use of the calculator illustrated in FIG. 3 assumes that there will be both a foreground element and a background element present in the object field, that is to say, that the stereoscopic picture will be a three-plane picture. In some circumstances, however, it is desirable to include only foreground matter or background matter in addition to the key subject matter element. This will result in a two-plane stereoscopic picture. The calculator of the invention enables computation of the correct T value for use in producing two-plane pictures as well as three-plane pictures. In the case of the two-plane picture, the KEY SUBJECT indicator 40 and the FOREGROUND indicator 38 or the BACKGROUND indicator 42, as the case may be, are located at the appropriate readings on the scale 34 and the number of divisions lying between the intercepts of the indicators with the appropriate focal length scale is noted. Assuming, by way of example, that the key subject matter element is to be located at 3 ft, that there is to be no foreground element and that the background element is to be located at 14 ft, it may readily be seen that, for a 25mm focal length camera, there will be approximately 4½ divisions lying along the 25mm focal length scale between the intercepts of the KEY SUBJECT indicator 40 and the BACKGROUND indicator 42. As only a key subject matter element and a background element are to be present in the final picture, however, the actual value of T which should be used in taking the picture should be one half of that which would be obtained from chart 48 if it were entered with an index number determined on the basis of 4½ divisions. The correct T value in this case may be found simply by doubling the number of divisions determined from the focal length scale and using that number (9) to derive the appropriate index number. The proper index number would therefore be 16.0, it being the next higher index number to 9 divisions.

If a 1 × 1 inch film format and a 10 × 10 inch final picture size are again assumed, the proper track in this instance would be AA.

It will further be understood that where the T value is fixed, as, for example, where a multi-lens camera of the type described in U.S. application Ser. No. 398,990 is used in photographing the object field, the calculator may be used to work backwards from the T value to arrive at correct values of $a$, $k$ or $b$. This assumes that the calculator is designed on the basis of a number N of two-dimensional views equal to the number of lenses in the camera, or gives the T values in terms of the spacings between adjacent vantage points. If it is assumed that the distance between the endmost lenses is approximately the same as that between the endmost vantage points of scale B of FIG. 3, an index number may be obtained from chart 48 once the film format and the final picture size are selected. For a 1 × 1 inch film format and a 10 × 10 inches final picture size, for instance, it may be seen that track B corresponds to an index number of 4.0. Then, if the focal length of the camera lenses is 50mm and the location of one of the key subject matter element, the foreground element and the background element is known, the correct placement of the other two elements may be determined. For example, if the key subject matter element is to be placed at 3.5 ft, the proper location of the foreground element and the background element may be obtained by placing the corresponding FOREGROUND and BACKGROUND indicators 38 and 42, respectively, at a distance of two divisions along the 50mm focal length scale on either side of the intercept with that scale of KEY SUBJECT indicator 40. Readings of $a$ of 3.2 ft and of $b$ of 4.6 ft may then be obtained from scale 34.

Construction and Calibration of Calculator

Figure 4:
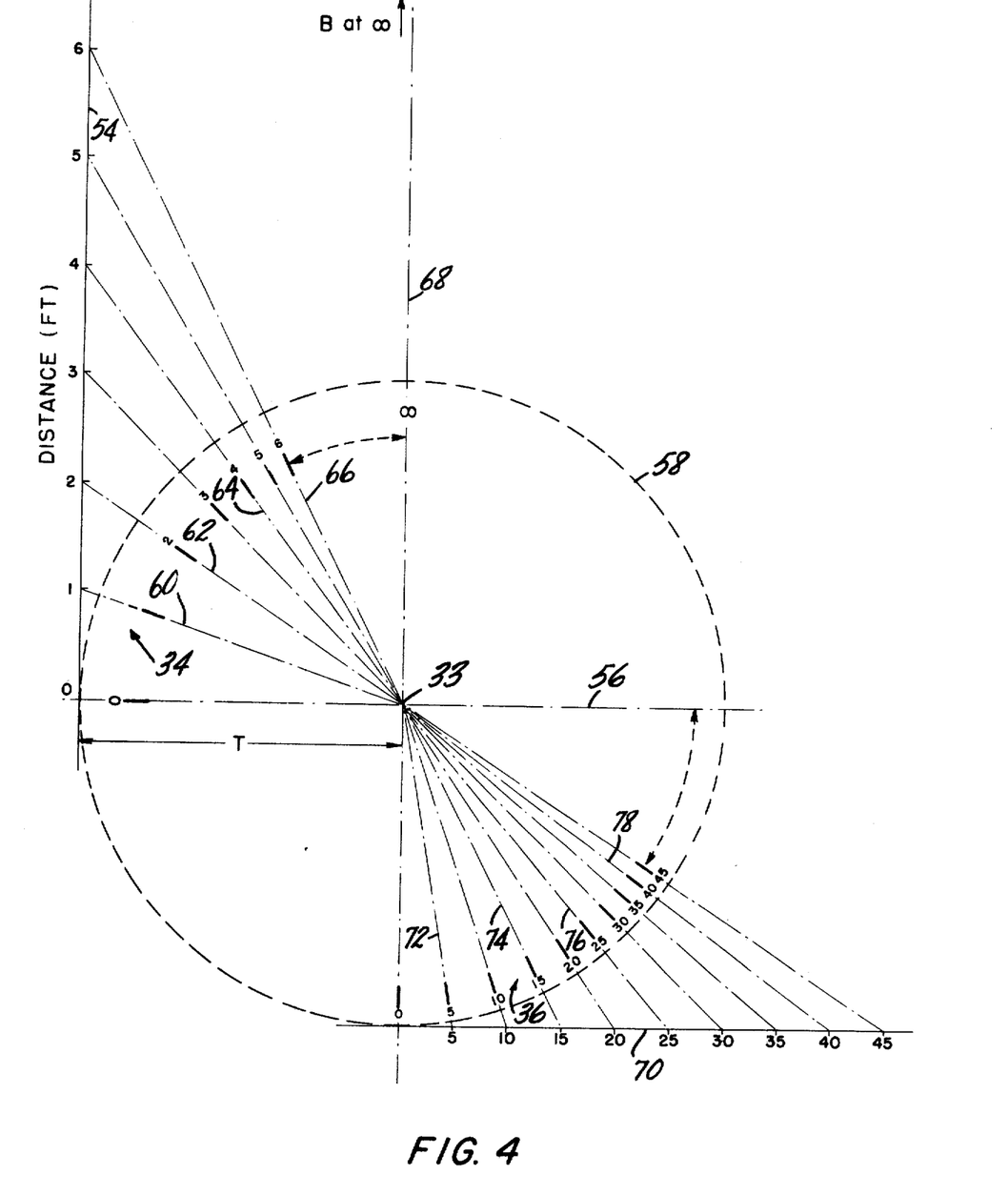
FIGS. 4, 5 and 6 are diagrammatic views depicting the manner of construction and calibration of the calculator of FIG. 3.

The manner of construction and calibration of the calculator may be seen from FIG. 4. Initially, two mutually perpendicular lines 54 and 56 are constructed. Line 54 corresponds to the line in FIG. 2 extending through the generalized object field elements A, K and B. Line 56 corresponds to the lens plane of FIG. 2. Distances from the lens plane to object field elements are plotted linearly along line 54 in any convenient units, e.g. feet. Depending upon the desired size of the calculator and fineness of the readings to be provided by scales 34, 36 and 46, a point on line 56 is selected at an arbitrary distance from line 54. This point then becomes the reference point 33 of the calculator. Suitably, point 33 might be located on the order of three inches from line 54. For the purpose of constructing the calculator, the lefthand endmost vantage point 18 (see FIG. 2) is considered to be on line 54 and the righthand endmost vantage point 26 is considered to be at point 33. The distance between line 54 and point 33 in FIG. 4 thus corresponds to T.

If the base member of the calculator is to be circular, a circular outline 58 of the desired radius is drawn around reference point 33 to define the general outline of the base member. If desired, the radius of the circle 58 may be equal to the distance along line 56 between the reference point 33 and line 54, although this need not be the case.

Scale 34 may then readily be calibrated by constructing straight lines between distance points along line 54 and the reference point 33, such as are indicated at 60, 62, 64 and 66 for the distances 1 ft, 2 ft, 4 ft and 6 ft, respectively, and marking the points at which these lines intersect with an arc adjacent the periphery of circle 58. For an object field element distance of 0 ft, the straight line connecting the 0 distance point on line 54 and reference point 33 is of course coincident with line 56, and defines one limit of scale 34. The other limit of scale 34 is defined by a line connecting an object field element at infinity with point 33, and this line, indicated at 68 in FIG. 4, is perpendicular to line 56. Theoretically, therefore, scale 34 occupies one quadrant of the circle 58. However, as the graduations along scale 34 become quite small at larger distances from the lens plane, it might not be necessary to plot all points along scale 34 as infinity is approached.

The rate at which the scale 34 readings increase may be controlled by varying the spacing between point 33 and the line 54. A larger spacing than that depicted in FIG. 3 will provide a more gradual increase, and a smaller spacing will provide a more rapid increase. The useful lengths of arc of scale 36 and of scales 46 may likewise be varied as desired by selection of the width of the divisions along line 54. Thus, a shorter width between points on line 54 will provide a larger angle over which scale 36 and scales 46 may be plotted. Conversely, a longer width will provide a smaller angle.

To calibrate scale 36, a line 70 is constructed parallel to line 56 and, beginning at line 68, is graduated linearly into a number of divisions of any convenient width. For clarity, only every fifth division is shown. Scale 36 is then constructed by connecting point 33 and the divisions along line 70 with a straight line and marking the corresponding points where the lines cross an arc along the periphery of circle 58. Lines 72, 74, 76 and 78 are representative of these. As with scale 34, the rate of increase of scale 36 may be controlled by varying the spacing of line 70 from point 33, and the width of the divisions along line 70 is selected to provide the desired accuracy of readings on scale 36.

The construction, mounting and function of the FOREGROUND, KEY SUBJECT and BACKGROUND indicators have been described and further apparent from inspection of FIG. 4. They are in effect the functional equivalents of construction lines drawn through reference point 33 and connecting readings on scale 34 with the corresponding points on scale 36.

Figure 5:
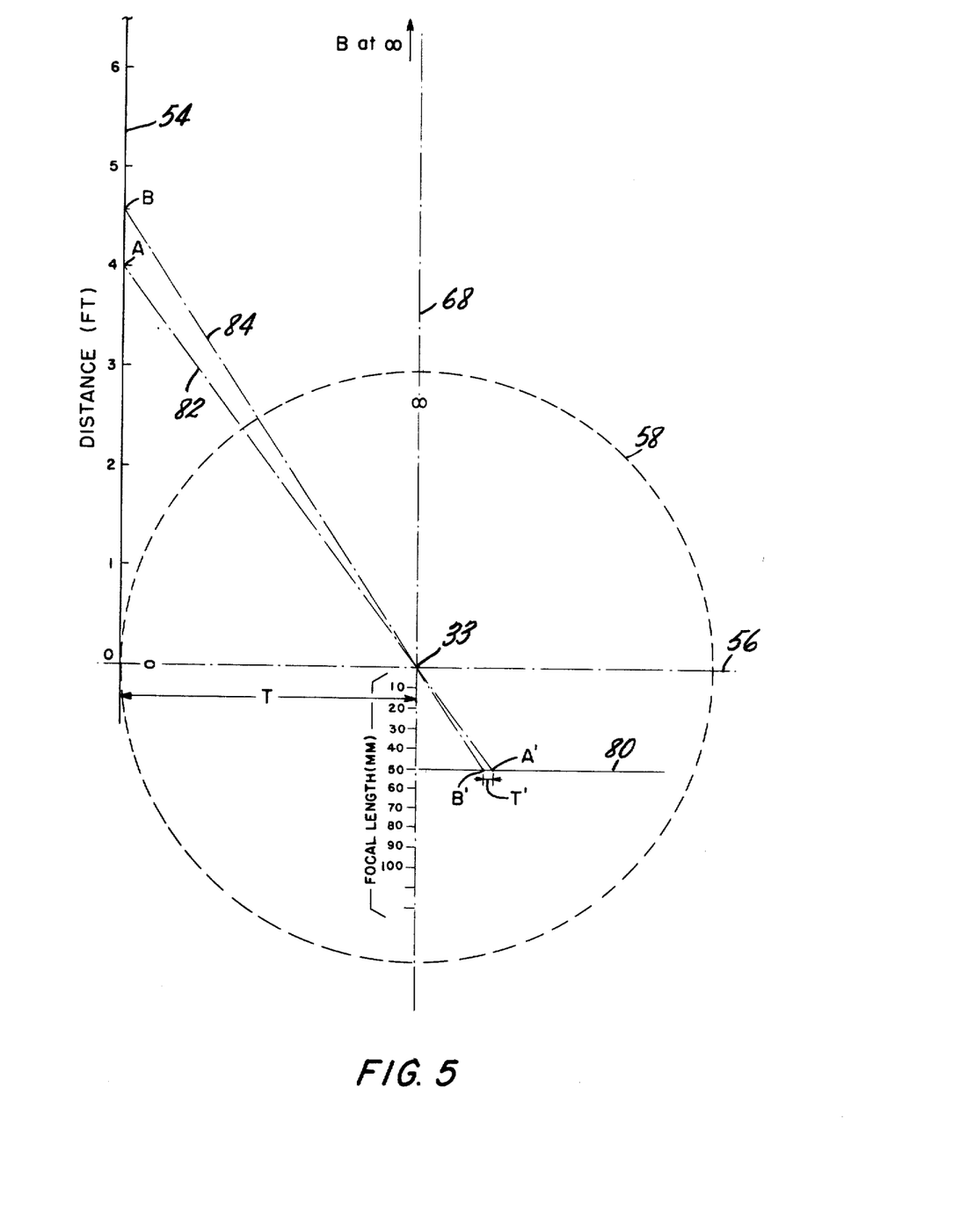
Figure 6:
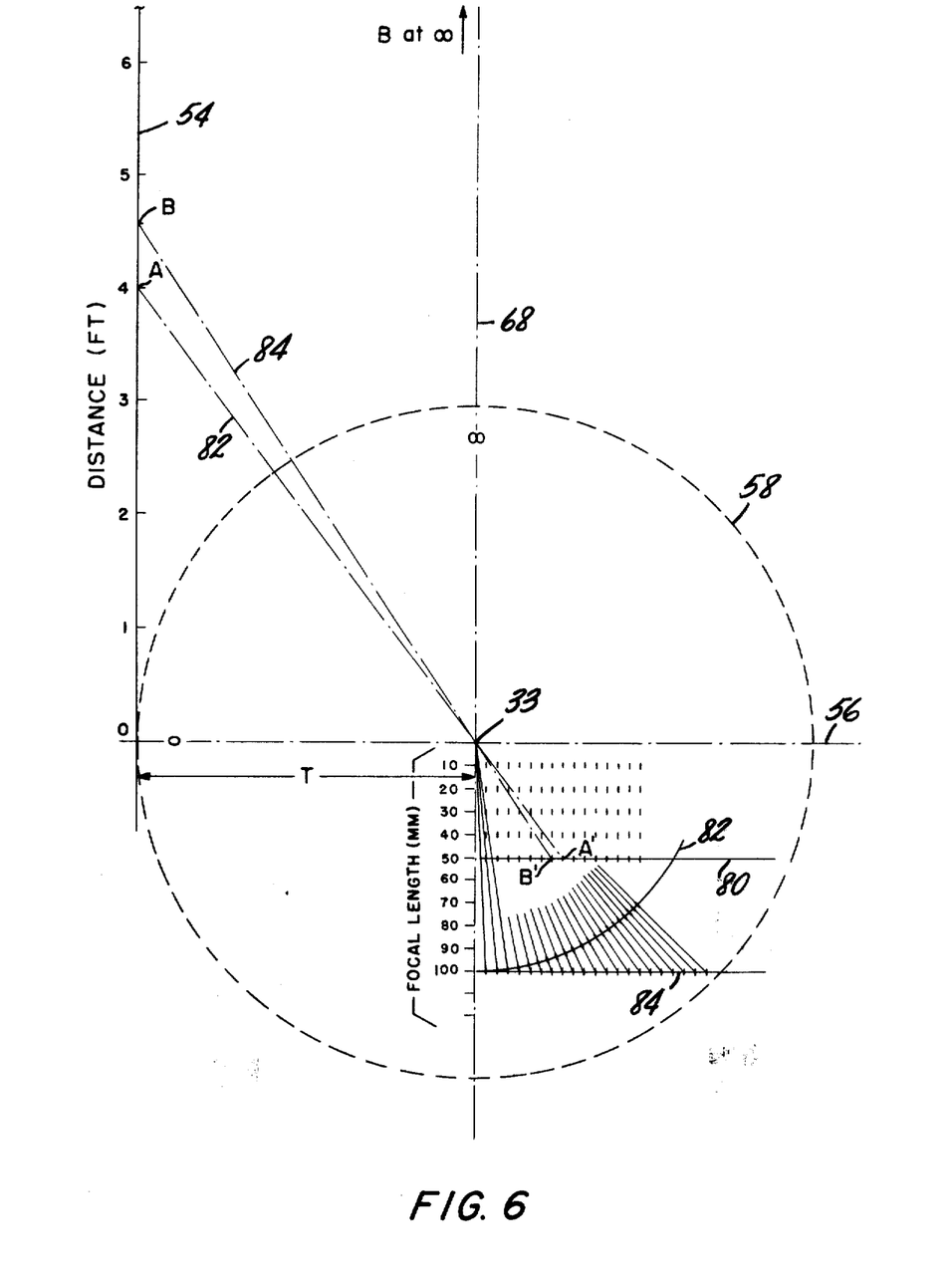

The manner of construction and calibration of the focal length scales 46 may be appreciated by reference to FIGS. 5 and 6, where scales 34 and 36 have been omitted to avoid undue complexity.

As an initial step, values of the focal length $f$ are plotted linearly along line 68 starting at line 56 or at some arbitrary distance therefrom. Selecting a convenient focal length, e.g. 50mm, a line 80 is drawn from the 50mm point on line 68 in a direction parallel to line 56. The distance $a$ to the nearest foreground element A is then arbitrarily selected, e.g. at 4 ft. A line 82 extended from the 4 ft point on line 54 through reference point 33 establishes the point along line 80 which corresponds to the image A' of the element A. Then, to determine the width of a single division along line 80, equation (2) is solved for the assumed values of $a$ and $f$ for an incremental change in the parallax value $X_{T'}$. For this purpose, the value of T used is that of a track to be provided on the camera support which is selected as a reference or standard. If the T value selected is taken as 200mm, and the incremental change in the value of $X_{T'}$ is assumed, for convenience, to be 1.0mm, the value of $b$ obtained from equation (2) is approximately 4.55 ft. This point is located on lines 54, and the locus of the image B' along line 80 is determined by constructing a straight line 84 through the 4.55 point on line 54 and reference point 33. The distance between A' and B' along line 80 is therefore representative of a value of $X_{T'}$ of 1.0mm, and this distance becomes the width of a single division on the focal length scales.

The individual focal length scales are then constructed as illustrated in FIG. 6. Considering first the 50mm scale, a number of divisions are laid off along line 80, each of which is equal in width to the incremental distance A'–B'. Like divisions are then established on the other focal length scales, these being shown for illustrative purposes on the 10mm to 40mm and 100mm scales only. Where the format of the calculator is circular, it is then necessary to convert the straight line focal length scales thus produced to circular scales. The manner in which this is done is illustrated in connection with the 100mm scale. Using reference point 33 as the center, an arc 82 is drawn of a radius equal to the distance along line 68 between point 33 and the 100mm point. Thereafter, straight lines are constructed between point 33 and the divisions along line 84 of the 100mm scale, and the points at which these lines intercept with arc 82 establish the corresponding graduations of the circular 100mm scale. The other circular focal length scales are constructed in a like manner. If the resulting divisions along the circular focal length scales are too fine for accurate readings, they may be enlarged by increasing the distance from line 56 to the various points therealong corresponding to the focal lengths.

It remains then to establish the desired relationship between the divisions of the focal length scales 46 and chart 48. A first step here is to express the T values in terms of index numbers which may be related to readings, in divisions, on the focal length scales. If it is assumed that the camera support includes a number of separate tracks AA, A, B, C, D, and E, etc., having T values of 12.5mm, 25mm, 50mm, 100mm, 150mm and 200mm, etc., respectively, the index numbers may be derived in a way which relates the T value of each track to the T value of a reference track. Selecting 200mm as the reference value of T, the index numbers may be determined in accordance with:

$$\text{index number} = 200/\text{T value of track} \qquad (4)$$

The index numbers corresponding to the assumed tracks may then be tabulated as follows:

TABLE I

| Track | Length | Index Number |
|---|---|---|
| AA | 12.5mm | 16.0 |
| A | 25mm | 8 |

TABLE I-continued

| Track | Length | Index Number |
|---|---|---|
| B | 50mm | 4 |
| C | 100mm | 2 |
| D | 150mm | 1.5 |
| E | 200mm | 1.0 |

The desired total parallax value $X_{T''}$ in the integrated stereoscopic picture is then determined. As pointed out above, the maximum permissible value of $X_{T''}$ for a three-plane stereoscopic picture wherein $X_{KA''}$ and $X_{BK''}$ are substantially equal is $2cW(n-1)$. W, N and c represent preliminary design parameters which are selected preparatory to calibrating chart 48. For purposes of illustration, W may be taken as 0.5 mm, N as 11 and c as 1.0. Accordingly, the maximum permissible value of $X_{T''}$ would be 10mm. For maximum stereoscopic effect, it is desired to approach this value in the stereoscopic picture without of course exceeding it.

The foregoing value of $X_{T''}$ is the total parallax value in the stereoscopic picture, and must be reduced by the enlargement ratio R ($X_{T''}$ /R) to determine the corresponding total parallax value $X_{T'}$ to be achieved (but not exceeded) in the two-dimensional views. Table II presents values of $X_{T'}$ corresponding to illustrative two-dimensional film sizes and final stereoscopic picture sizes, that is to say, to illustrative enlargement ratios.

TABLE II

| 2D Film Size | Final Picture Size | R | $X_{T'}$ |
|---|---|---|---|
| 1" × 1" | 10" × 10" | 10 | 1.0mm |
| 1" × 1" | 20" × 20" | 20 | 0.5mm |
| 2" × 2" | 10" × 10" | 5 | 2.0mm |
| 2" × 2" | 20" × 20" | 10 | 1.0mm |

Since, as set forth above, one division on focal length scales 46 represents 1.0mm of total parallax $X_{T'}$ in the two-dimensional views, it will be appreciated from Table II that for a maximum permissible value of $X_{T''}$ of 10.0mm an R of 5 corresponds to 200 percent of a focal length scale division, an R of 10 corresponds to 100 percent of a division, and an R of 20 corresponds to 50 percent of a division. These may be viewed as percentage factors of 2.0, 1.0 and 0.5, respectively.

Then, if the index number is equated to the number of divisions along a focal length scale between the intercepts therewith of the FOREGROUND and BACKGROUND indicators, it will be appreciated that the T value corresponding to that index number (see Table I) must be weighted by the appropriate percentage factor to arrive at the correct T value to be used. For example, if the number of divisions along the focal length scale is 4.0 and the enlargement ratio to be employed is 10.0, the percentage factor is 1.0 and the correct T value is 50mm or, in other words, track B. However, should R be 20, the T value corresponding to an index number of 4.0 (50mm) must be multiplied by the percentage factor of 0.5 to determine the correct value, i.e., 25mm or track A. Similarly, if R is 5, the correct T value is 100mm, or track C, this corresponding to the product of a percentage factor of 2.0 and the 50mm T value corresponding to an index number of 4.0.

Using this weighting scheme, chart 48 may therefore readily be made up to give the correct T values or tracks for specific index numbers and specific enlargement ratios. Table III illustrates one possible format for construction of the chart, with the columns from Index No. to the right corresponding to chart 48 of FIG. 3.

TABLE III

| Track | T value (mm) | Index No. | 1"×1" Format 10"×10" | 1"×1" Format 20"×20" | 2"×2" Format 10"×10" | 2"×2" Format 20"×20" |
|---|---|---|---|---|---|---|
| AA | 12.5 | 16.0 | AA | * | A | AA |
| A | 25 | 8 | A | AA | B | A |
| B | 50 | 4 | B | A | C | B |
| C | 100 | 2 | C | B | E | C |
| D | 150 | 1.5 | D | B | E* | D |
| E | 200 | 1.0 | E | C | E* | E |

The T values, index numbers and enlargement ratios provided for in chart 48 may of course vary in accordance with the intended use of the calculator. For general usage, however, it is desirable to provide a range of index numbers which encompasses a reasonably broad range of T values and which affords a reasonable selection of T values within that range. That is to say, there should not be so large a spread between adjacent index numbers as to result in unduly large differences between the magnitudes of adjacent T values. These should increase gradually from a shortest to a longest spacing between vantage points, and therefore provide at least one T value which is a reasonably close approximation of the value which would be obtained upon solving equation (2) directly for the specific values of the photographic situation immediately before the photographer. In this connection, it might be desirable, for example, to provide additional scales for the blocks in Table III denoted by asterisks.

If desired, chart 48 may be calibrated to give the T values in terms of the spacing between vantage points, i.e., T/(N−1), as the chart may then be used irrespective of the number N of two-dimensional views to be taken. This may be done by calculating the maximum permissible value of $X_{T''}$ on the basis of 2cW instead of 2cW(N−1). The value of $X_{T''}$ /(N−1) thus obtained is used in Table II to derive the $X_{T'}$ /(N−1) values corresponding to a specific enlargement ratios and hence the corresponding percentage factors. The T values of the several tracks and the corresponding index numbers (Table I) would in this instance also be selected and computed on the basis of spacings between adjacent vantage points.

Although the invention has been described with reference to a specific embodiment thereof, many variations and modifications of that embodiment may be made without departing from the inventive concepts disclosed. For instance, the scale arrangement of the calculator may be generally rectangular rather than circular. In this case, scale 34 would comprise line 54 (see FIG. 3) and the divisions therealong, scale 36 would comprise line 70 and its divisions, and the focal length scales 46 would comprise the plurality of straight lines 80, 84, etc., and their divisions, extending from the focal length values along line 68 (see FIG. 6). All such variations and modifications, therefore, are intended to be included within the spirit and scope of the appended claims.

We claim:

1. A calculator useful in determining the placements of the nearest foreground element, the key subject matter element and the farthest background element of an object field such that, upon photographing the object field along generally parallel lines of sight from a plurality N of vantage points aligned in a straight path extending generally perpendicularly to the lines of sight, the separation $X_{KA'}$ between the image of the nearest foreground element and the image of the key subject matter element, as recorded at any one vantage point, will be substantially equal to the separation $X_{BK'}$ between the image of the key subject matter element and the image of the farthest background element image, as recorded at the same vantage point, comprising:

a base member;

a first scale on the base member, the first scale being located on one side of a reference point on the base member and being calibrated to indicate distance from the lens plane of the camera used in photographing the object field to the elements of the object field, as measured in a direction generally parallel to the lines of sight;

a second scale on the base member, the second scale being located on the opposite side of the reference point in generally diametrically opposed relation to the first scale;

a foreground indicator, a key subject indicator and a background indicator, the indicators being supported on the base member for individual rotation about the reference point and being adapted to relate points on the first scale corresponding to distances $a$, $k$ and $b$ to the nearest foreground element, the key subject matter element and the farthest background element, respectively, to corresponding points on the second scale; and the second scale being so calibrated that equal readings along the second scale between the intercepts therewith of the foreground indicator and the key subject indicator, on the one hand, and between the intercepts therewith of the key subject indicator and the background indicator, on the other, produce corresponding readings on the first scale of the distances $a$, $k$ and $b$ to the nearest foreground element, the key subject matter element and the farthest background element, respectively, which are substantially in the relationship $$k/a + k/b = 2.$$

2. The calculator of claim 1 wherein the first and second scales are in the form of arcs centered on the reference point.

3. The calculator of claim 1 wherein:

the first scale is in the form of a straight line extending perpendicularly to a first line passing through the reference point;

the second scale is in the form of a straight line extending perpendicularly to a second line passing through the reference point in perpendicular relation to the first line; and the first and second scales are calibrated relative to the first and second lines, respectively.

4. The calculator of claim 1 further comprising:

a focal length scale on the base member intermediate to the second scale and to the reference point; and the focal length scale being calibrated relative to the first scale such that each division along the focal length scale is representative of the change along the first scale corresponding to an incremental change in $X_{T'}$ for predetermined values of T, $f$ and one of $a$ or $b$, where $f$ has the same value as that of said focal length scale and $X_{T'}$, T, $f$, $a$ and $b$ are related in accordance with:

$$T = \frac{X_{T'} \, ab}{f(b-a)}$$

5. The calculator of claim 4 wherein the base member further includes a chart relating predetermined enlargement ratios and readings along the focal length scale between the intercepts therewith of the foreground indicator and the background indicator, when said foreground indicator is aligned on the first scale with the distance to the nearest foreground element and said background indicator is aligned on the first scale with the distance to the farthest background element, to corresponding maximum separations between the endmost vantage points from which the two-dimensional views may be taken, using a camera having a focal length corresponding to that of said focal length scale, without $X_{T'}$ exceeding a predetermined maximum value.

6. The calculator of claim 4 wherein:

the base member includes a plurality of focal length scales, each corresponding to a different focal length $f$; and each focal length scale is calibrated and arranged relative to the first scale in the aforesaid manner of said first-mentioned focal length scale.

7. The calculator of claim 6 wherein the base member further includes a chart relating the readings afforded by the focal length scales and predetermined enlargement ratios to corresponding maximum separations between the endmost vantage points.

8. The calculator of claim 6 wherein the first scale, the second scale and each of the focal length scales are in the form of arcs centered on the reference point.

* * * * *

UNITED STATES PATENT AND TRADEMARK OFFICE
CERTIFICATE OF CORRECTION

PATENT NO. : 3,908,112
DATED : September 23, 1975
INVENTOR(S) : Allen K. W. Lo et al.

It is certified that error appears in the above-identified patent and that said Letters Patent are hereby corrected as shown below:

Col. 2, line 63, "cart" should read --chart--;

Col. 3, line 36, "389,990" should read --398,990--;

Col. 3, line 63, "point" should read --points--;

Col. 6, line 40, "pictures" should read --picture--;

Col. 10, line 58, after "and" insert --the--;

Col. 12, line 15, after "4.55" insert --ft--;

Col. 13, line 13, "(n-1)" should read -- (N-1)--; and

Col. 14, line 53, delete "a".

Signed and Sealed this sixth Day of January 1976

[SEAL]

Attest:

RUTH C. MASON
Attesting Officer

C. MARSHALL DANN
Commissioner of Patents and Trademarks